United States Patent [19]

Lagoni

[11] Patent Number: 5,003,394
[45] Date of Patent: Mar. 26, 1991

[54] DYNAMIC VIDEO SYSTEM INCLUDING AUTOMATIC CONTRAST AND "WHITE-STRETCH" PROCESSING SECTIONS

[75] Inventor: William A. Lagoni, Indianapolis, Ind.

[73] Assignee: RCA Licensing Corporation, Princeton, N.J.

[21] Appl. No.: 398,845

[22] Filed: Aug. 25, 1989

[51] Int. Cl.$^5$ .............................................. H04N 5/57
[52] U.S. Cl. ................................... 358/168; 358/169; 358/174
[58] Field of Search .............. 358/168, 169, 172, 174, 358/39

[56] References Cited

U.S. PATENT DOCUMENTS

| | | | |
|---|---|---|---|
| 4,489,349 | 12/1984 | Okada | 358/168 |
| 4,599,643 | 7/1986 | Harlan | 358/174 |
| 4,651,210 | 3/1987 | Olson | 358/169 X |
| 4,654,710 | 3/1987 | Richard | 358/169 |
| 4,843,472 | 6/1989 | Shinada | 358/168 X |
| 4,918,529 | 4/1990 | Douziech et al. | 358/174 |
| 4,937,670 | 6/1990 | Whitledge | 358/169 X |
| 4,937,671 | 6/1990 | Engel | 358/169 |

Primary Examiner—Howard W. Britton
Assistant Examiner—Mark R. Powell
Attorney, Agent, or Firm—Joseph S. Tripoli; Peter M. Emanuel

[57] ABSTRACT

A television system is disclosed including sections for limiting peak white drive to a display device (e.g., of the direct view of projection type) while maintaining relatively high subjective image contrast and brightness. Specifically, the system includes an automatic contrast control section for controlling the amplitude of the luminance signal in response to the peak value of a luminance-representative image component signal preceded by a "white-stretch" control section for emphasizing mid-range luminance components relative to high-range luminance components as a function of the average value of the luminance-representative image component. In this way, spot blooming and display driver saturation can be minimized while providing subjectively sharp, bright pictures.

13 Claims, 3 Drawing Sheets

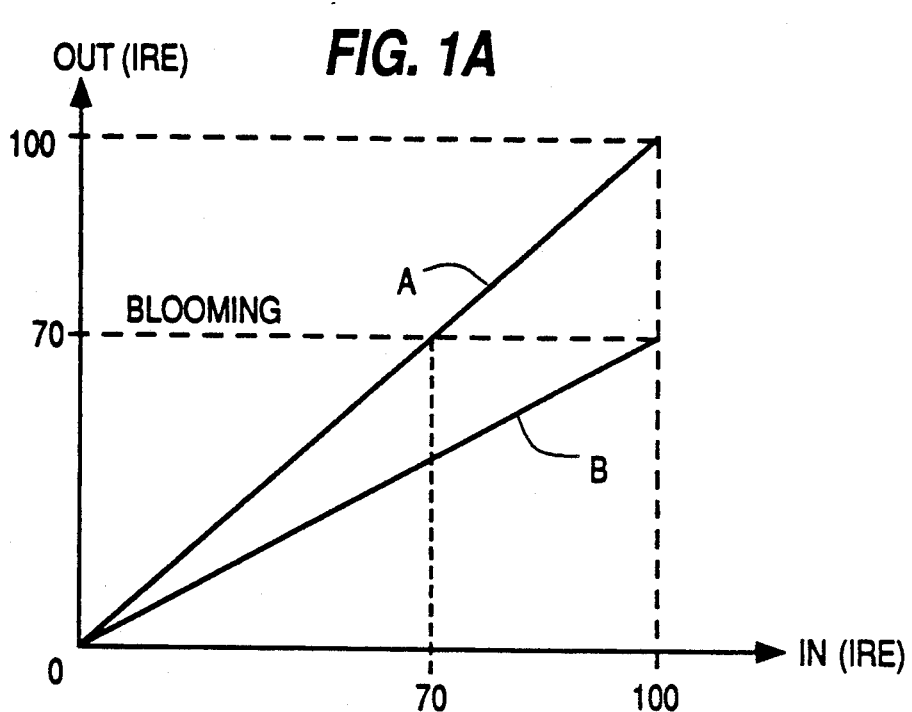
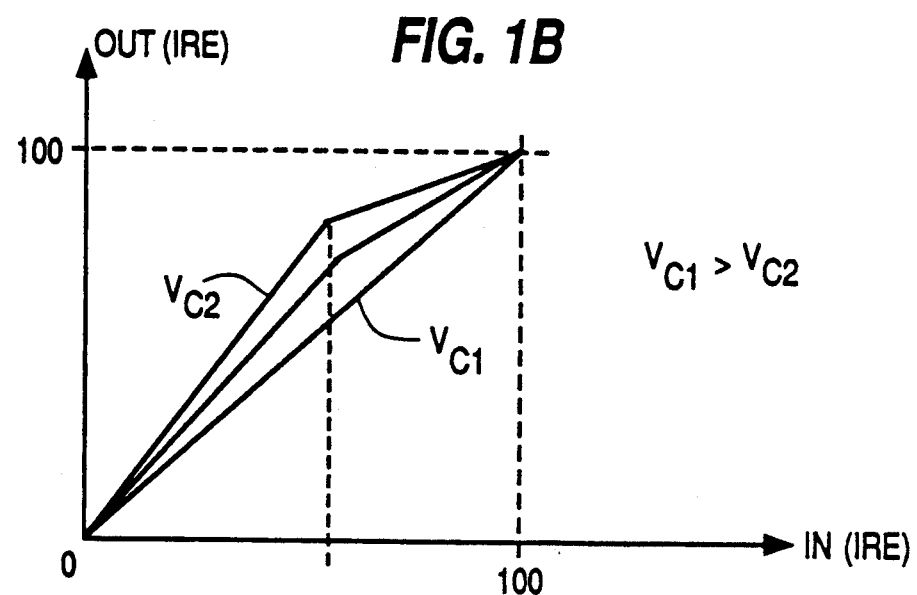

DYNAMIC VIDEO SYSTEM INCLUDING AUTOMATIC CONTRAST AND "WHITE-STRETCH" PROCESSING SECTIONS

RELATED APPLICATIONS

The present application contains subject matter which is related to the subject matter disclosed in U.S. Pat. Application Ser. No. 398,847, entitled "Amplifier Arrangement For Producing A Controllable Non-Linear Transfer Characteristic Useful For Improving The Contrast Of An Image" and U.S. Pat. Application Ser. No. 398,849, entitled "Control Signal Generator For A Television System", both filed concurrently with the present application and on behalf of the same inventor.

FIELD OF THE INVENTION

The present invention concerns automatic gain control apparatus for a television system and especially automatic gain control apparatus affecting the luminance component in response to certain characteristics of a reproduced image.

BACKGROUND OF THE PRESENT INVENTION

In television systems, it is known to reduce one or both of the contrast and brightness of a reproduced image in order to inhibit "white-spot blooming" due to excessive electron beam currents of the cathode ray tube (CRT) display device, as well as to inhibit CRT drive and phosphor amplifier saturation which tend to limit slewrate. This may be accomplished by directly sensing the beam current and, in response, generating a control signal for the contrast and/or brightness control sections of the system. The control signal may also be generated by detecting a characteristic of a video signal coupled to the cathode ray tube. For example, U.S. Pat. No. 4,599,643 entitled "Apparatus Responsive To Plural Color Video Signals For Amplitude Limiting The Video Signals To Assist Beam Current Limiting", issued to W. E. Harlan, discloses combining the three color signals coupled to the cathode ray tube and detecting the average of the white-going peak of resulting signal above a predetermined threshold to generate a contrast control signal.

SUMMARY OF THE INVENTION

While it is desirable to prevent spot blooming, for example, by automatically controlling the contrast of the reproduced image, it is recognized by the present inventor that such contrast reduction may reduce the contrast and subjective brightness of the reproduced image. More specifically, it is recognized that while it is desirable to provide automatic contrast control apparatus to reduce the amplitude of the luminance signal when the reproduced image includes white-going peaks exceeding a predetermined level corresponding, e.g., to characters, mid-range luminance amplitudes will also be reduced. This results in a contrast and subjective brightness reduction.

To overcome this problem, in accordance with an aspect of the invention, a non-linear amplitude control section is coupled in cascade with the contrast control unit to dynamically emphasize mid-range amplitude luminance levels relative to high amplitude luminance levels as a function of the average value of the luminance signal processed by the contrast control apparatus. For images containing excessive white-going peaks but a low level average luminance component, the effect is to decrease the amplitude of the white-going peaks while simultaneously increasing the amplitude of mid-range luminance levels. In this way, "white spot blooming" (as well as CRT phosphor and driver saturation) can be minimized while providing subjectively sharp, bright images.

These and other aspects of the invention will be described in detail below in connection with the accompanying Drawing.

BRIEF DESCRIPTION OF THE DRAWINGS

The Drawings include:

FIGS. 1A and 1B showing gain characteristics useful in understanding the operation of the preferred embodiment of the invention;

DETAILED DESCRIPTION OF THE PREFERRED EMBODIMENT OF THE INVENTION

Figure 1:
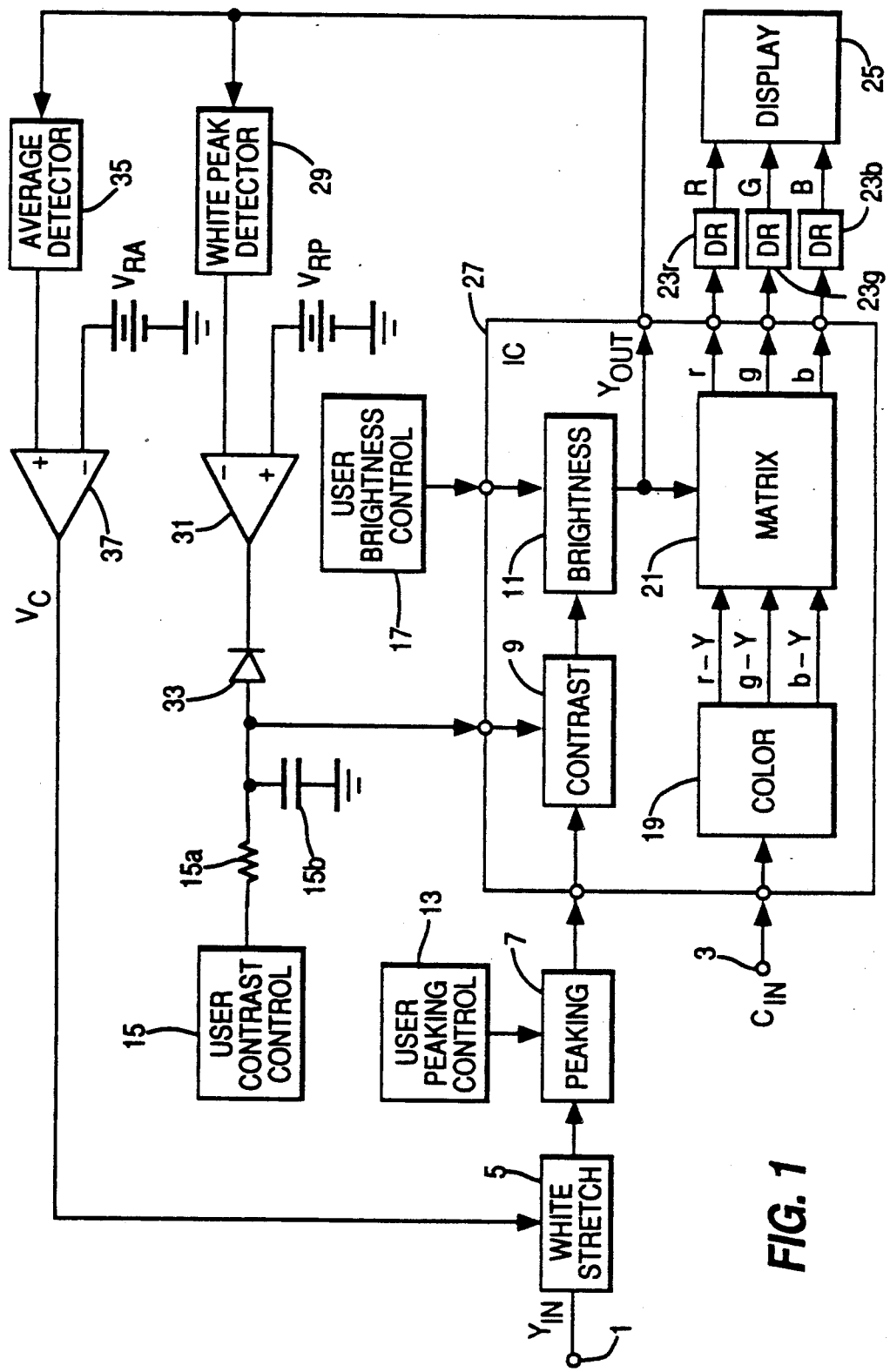
FIG. 1 showing a schematic, in block form, of a preferred embodiment of the invention.

In the television system shown in FIG. 1, separated luminance ($Y_{IN}$) and chrominance ($C_{IN}$) signal components derived by, e.g., a comb filter (not shown), from a composite video signal are coupled to respective input terminals 1 and 3 and are processed to reproduce an image.

The input luminance signal component ($Y_{IN}$) is processed in a cascade of luminance processing sections including a "white-stretch" section 5, a peaking section 7, a contrast section 9 and a brightness section 11, to produce a processed luminance output signal $Y_{OUT}$. The function and operation of "white-stretch" processing section 5 will be explained in detail below. Peaking, contrast and brightness sections 7, 9 and 11 are of conventional design and function as known in the television field to respectively control the high frequency content of the output luminance signal ($Y_{OUT}$) corresponding to the sharpness of image transitions or edges, the amplitude of $Y_{OUT}$ corresponding to image contrast, and the DC component of $Y_{OUT}$ corresponding to image brightness. Peaking, contrast and brightness user control units 13, 15 and 17 are provided to allow a user to manually adjust the respective characteristics of the image. Each of the user control units 13, 15 and 17 produces a DC control signal for the respective luminance processing section, and for that purpose may include a respective potentiometer. Alternately, as is more conventional in modern television systems, each user control unit may include a respective digital-to-analog converter which is under the control of a common control microprocessor. The microprocessor receives user initiated commands corresponding to the image characteristics from a keyboard.

The input chrominance component is processed by a color processing section 19 including a color demodulator, a saturation (amplitude) processing unit and a tint or hue (phase) processing unit (not shown) to produce low level red, green and blue color difference signals r-Y, g-Y and b-Y. Alternately, the color difference signals may be of the I and Q type. The saturation and tint processing may be manually and/or automatically controlled by elements not shown.

The color difference signals, r-Y, b-Y and g-Y, and the processed luminance signal, Y are coupled to a matrix 21 where they are combined to produce low level red, green and blue color signals, r, g and b. The low level r, g and b color signals are amplified by respective drive amplifiers (DR) 23r, 23g and 23b to produce high level R, G and B color signals suitable for driving display device 25. Display device 25 may be a single direct view cathode ray tube (CRT), or a projection arrangement comprising individual red, green and blue CRTs, projection optics and a screen. In the direct view case, the high level R, G and B color signals are coupled to respective cathodes of the common CRT. In the projection case, the high level R, G and B color signals are coupled to the cathodes of the respective individual CRTs.

Although not shown for the sake of simplicity, the television system also includes a synchronization processing section for deriving horizontal and vertical synchronization pulses contained in the input luminance signal $Y_{IN}$ These synchronization pulses are processed to derive horizontal and vertical retrace blanking pulses which are inserted, within matrix 21, in the respective retrace intervals of the low level r, g and b signals so that display device 25 will be "blanked" during the respective retrace intervals in order to avoid producing visible retrace lines. The synchronization pulses are also processed by a deflection signal generating unit to produce deflection signals for the single CRT in the direct view case, or for the individual CRTs in the projection case.

Portions of the television system, such as contrast, brightness, color processing sections 9, 11 and 19 and matrix 21, may be included within a single integrated circuit IC indicated by block 27. Various signal input and output terminals are indicated by the small circles.

As earlier indicated, it is desirable to limit the electron beam current in order to avoid "white spot blooming". Typically, this is accomplished by sensing the current drawn by the CRT (or CRTs) from the associated high voltage power supply and generating a control signal for reducing one or both of the contrast and brightness of the reproduced image. In addition to such beam current control apparatus (not shown), in the television shown in FIG. 1, the peak drive level is limited to a predetermined value since electron beam spot size expands non-linearly at higher beam current amplitudes. Specifically, this is accomplished by sensing the peak of the processed luminance signal, $Y_{OUT}$, produced by the cascade of peaking contrast, and brightness processing sections 7, 9 and 11 to generate an automatic contrast control signal. The output or processed luminance signal, $Y_{OUT}$, is utilized, rather than the input luminance signal, $Y_{IN}$, since $Y_{OUT}$ is influenced by the peaking, contrast and brightness customer controls. This type of automatic contrast control (which also may be called "auto-pix", "pix" being an abbreviation for "picture"), prevents loss of detail sharpness in highlight (white) areas due to blooming, while permitting high contrast (and therefore subjectively bright) images when the signal peaks stay below the blooming threshold.

With reference to the schematic shown in FIG. 1, the automatic contrast control apparatus, in addition to contrast processing section 9, includes a peak detector 29 which detects the peaks of the white-going portion of the output luminance signal, Y UT A desirable peak detector, which is capable of responding to very sharp peak signals, is disclosed in U.S. Pat. Application Ser. No. 380,697, entitled "Peak Detector with Feedback", filed on July 14, 1989 in the name of G. A. Whiteledge. The DC output voltage of white peak detector 29 is coupled to an amplifier 31 which also receives a reference voltage, $V_{RP}$, corresponding to the peak level beyond which blooming is likely to occur. The output of amplifier 31 is coupled via a diode 33 to the junction of a series connected resistor 15a and shunt connected capacitor 15b comprising a low pass filter associated with user contrast control unit 15, e.g., to filter the pulse signal produced by a digital-to-analog converter. Resistor 15a and capacitor 15b also determine the time-constant of the contrast control loop. For the embodiment shown, it is assumed that white-going portions of the output luminance signal, $Y_{OUT}$, are positive-going, that increasing the DC contrast control signal corresponds to increasing gain, and therefore increasing contrast, and that decreasing the contrast control signal corresponds to decreasing gain and contrast. Accordingly, amplifier 31 is arranged and diode 31 is poled to decrease the contrast control signal, $V_C$, as a function of the peak of $Y_{OUT}$, when $Y_{OUT}$ exceeds the blooming threshold (corresponding to reference voltage $V_{RP}$).

The operation of the peak responsive automatic contrast control apparatus may be better understood by way of the following quantitative example. It is assumed that the maximum gain reduction available under automatic contrast control is 3 dB. In that case, at the maximum contrast control setting and at the nominal brightness control setting, maximum gain for the input luminance signal, $Y_{IN}$, is obtained as long as the peak amplitude of the output luminance signal, $Y_{OUT}$, is at or below 70 IRE units. Gain reduction occurs, as needed, as a function of the peak amplitude of the output luminance signal, for peak amplitudes between 70 and 100 IRE units. This is shown graphically by the gain characteristics associated with contrast processing section 9 in FIG. 1A. Curve A represents the gain characteristic at maximum contrast control for peak white amplitudes at or below 70 IRE units. Curve B represents the gain characteristic at maximum user contrast control for peak white amplitudes at 100 IRE units. Curve B also represents the gain characteristics of any peak white amplitude with contrast control reduced by 3 dB by means of user contrast control unit 15 or by automatic beam limiting apparatus (not shown).

As explained above, the white peak responding automatic contrast control apparatus inhibits spot blooming when the image contains excessively large white peaks in small areas corresponding, e.g., to informational characters or text provided by a television studio or other source such as a VCR with an "on-screen" display feature. However, since the gain characteristics of contrast processing section 9 is linear, all amplitude levels of the luminance signal are reduced by the white peak responding automatic contrast control apparatus when the image contains excessive small area white going peaks, independent of the characteristics of the remaining image. Thus, e.g., when 100 IRE peak amplitudes corresponding to characters are suddenly added to a luminance signal composed exclusively of 70 IRE and lower peaks (i.e., the normal luminance signal content), mid-range amplitude levels (e.g., 30–50 IRE) of the luminance signal as well as high amplitude levels are reduced. As a result, the viewer perceives a subjective reduction in the average brightness of the reproduced image because the 100 IRE peak amplitude levels associated with small image areas make only a small difference in the average brightness of the overall image. "White-stretch" processing section 5 is directed to this and other concerns.

The gain characteristic for "white-stretch" processing section 5 is graphically represented in FIG. 1B. As is indicated in FIG. 1B, the white-stretch gain characteristic includes a family of non-linear gain functions which have greater gains for mid-range and low amplitude levels of the input signal than for high amplitude levels of the input signal. The degree of non-linearity inversely depends on the magnitude of a control voltage $V_C$. Thus, the lowest degree of non-linearity (i.e., a linear function) is exhibited at the highest magnitude $V_{C1}$, of control voltage $V_C$ and the highest degree of non-linearity is exhibited at the lowest magnitude, $V_{C2}$, of control voltage $V_C$. In the preferred embodiment of the invention, control voltage $V_C$ represents the average value of the processed luminance signal, $Y_{OUT}$. The processed luminance signal, $Y_{OUT}$, is utilized rather than the input luminance signal, $Y_{IN}$, because, in this manner, the settings of peaking contrast and brightness processing sections 7, 9 and 11 are taken into consideration. Accordingly, when the average value of the processed luminance signal is low (with respect to a predetermined reference level, $V_{RS}$), due either to image content of the received television signal and/or user contrast and brightness settings, the mid-range amplitudes of the processed luminance signal, $Y_{OUT}$, will be boosted or emphasized relative to the high amplitude level. Conversely, when the average value is high, the gain function collapses and becomes linear.

The non-linear white stretch gain control processing dynamically interacts with the linear automatic contrast gain control processing. As a result, for relatively dark images containing small area white excursions, excessive peak white amplitudes are reduced due to contrast gain reduction but mid-light amplitudes (which would otherwise also be further reduced by the linear contrast gain reduction) are compensatingly increased according to the non-linear white stretch gain characteristic.

With reference to the schematic shown in FIG. 1, the control voltage, $V_C$, for white-stretch processing section 5 is generated in the following way. An average detector 35, which may simply comprise an R-C network, is utilized to detect the average value of the processed luminance signal, $Y_{OUT}$. The resulting DC signal is coupled to one input of an amplifier 37. The other input of amplifier 37 receives a reference voltage $V_{RA}$. The control voltage, $V_C$, for white stretch processing section 5 is developed at the output of amplifier 37. Average detector 35 and amplifier 37 are arranged with respect to signal polarities so that for average values of the processed luminance signal, $Y_{OUT}$, below $V_{RA}$, the magnitude of the control voltage, $V_C$, decreases in direct relationship to the average value.

By way of example, white stretch processing section 5 may be implemented in the manner disclosed in the concurrently filed Lagoni patent application entitled "Amplifier Arrangement For Producing A Controllable Non-Linear Transfer Characteristic Useful For Improving The Subjective Contrast Of An Image" referred to above.

Figure 2:
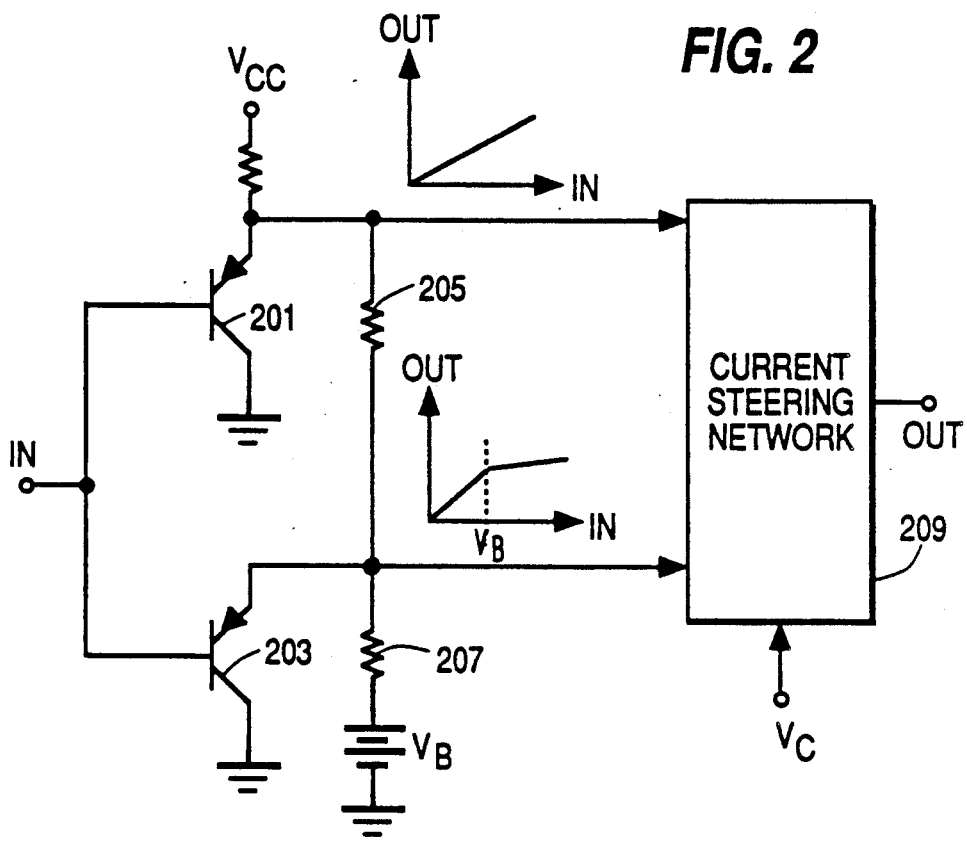
FIG. 2 showing a detailed schematic of a portion of the preferred embodiment shown in block form in FIG. 1.

Briefly, as is shown in FIG. 2, the arrangement disclosed in the concurrently filed application includes two PNP emitter-follower amplifiers 201 and 203 having their inputs coupled in parallel to receive an input signal and their outputs coupled together by a resistor 205. A bias voltage $V_B$ is coupled to the emitter of emitter-follower 203 through a resistor 207 so that emitter-follower 203 will cut-off before emitter-follower 201. Below the cut-off voltage, corresponding to bias voltage $V_B$, emitter-followers 201 and 203 provide the substantially same output signals. Accordingly, no current flows through resistor 205. However, above the cut-off voltage, emitter-follower 203 no longer provides an output signal and current now flows through resistor 205. By the voltage division action of resistors 205 and 207, an attenuated version of the output signal of emitter-follower 201 is provided at the junction of resistors 205 and 207 as. is indicated in FIG. 1B. Accordingly, linear and non-linear output signals are developed at the respective emitters of emitter-followers 201 and 203. The two output voltage are converted into corresponding currents and the resulting currents combined by a current steering network 209, comprising a "soft-switch", as a function of control voltage $V_C$. The overall gain characteristic is as shown in FIG. 1B.

White stretch processing section 5 is preferably located prior to other gain control sections, such as contrast processing section 9, as is shown in FIG. 1, because, in that way, the amplitude range of its input signal is relatively constant and predictable. This simplifies the implementation of white stretch processing section 5.

The operation of the television system shown in FIG. 1 with respect to the interaction between the automatic contrast and white stretch provisions is quantitatively illustrated by the following example. When the image has a moderately high brightness value without white-going portions corresponding to signal components above 70 IRE, the white peak responding automatic contrast control apparatus is not active and the white stretch gain function is linear ($V_C = V_{C1}$ in FIG. 1B). If signal peaks of 100 IRE corresponding to small white areas of the image, e.g., such as characters, are added, the automatic contrast control apparatus will tend to reduce the amplitude of all levels of $Y_{OUT}$ by up to 3dB. As a result, mid-range luminance amplitude levels at 50 IRE would tend to be reduced by about 15 IRE. Reference voltage $V_{RA}$ is imperically set so that white stretch processing section 5 will apply maximum gain ($V_C = V_{C2}$ in FIG. 1B) to $Y_{IN}$ in response to the reduction in the average value of $Y_{OUT}$ due to the overall contrast gain reduction under these conditions. By making the white stretch gain change such that the 50 IRE amplitude level of $Y_{IN}$ increases in the order of 15 IRE in steady state (i.e., when both white stretch processing section 5 and contrast processing section 9 have stabilized), the mid-range gain reduction to the linear automatic contrast gain control is compensated for by the non-linear white stretch gain increase.

The quantitative discussion above primarily concerns the white stretch gain characteristic for mid-range amplitudes. With respect to high amplitudes, i.e., amplitudes beyond the break-point of the non-linear gain functions, it has been found, by viewer perception studies, that the gain (slope) desirably should not be reduced below about 0.5.

In addition to the advantageous results obtained by the dynamic interaction between the white stretch and automatic contrast control apparatus discussed above, the white stretch apparatus has been found particularly useful in a television system employing relative wideband CRT drivers to provide greater image resolution. Such wideband drivers have lower source impedances than lower bandwidth drivers. The lower source impedances tend to affect the gamma characteristics of the television system so as to reduce mid-range light output. The non-linear white stretch gain functions, which emphasize or boost mid-range amplitudes relative to high amplitudes, compensates for the reduction in mid-range amplitudes due to lower source impedance wideband CRT drivers.

As earlier noted, for automatic contrast and white stretch control it is desirable to detect the peak and average, respectively, of a signal representing the luminance component of the reproduced image after image characteristics, such as contrast and brightness, have been adjusted so that the respective control signals will properly reflect the content of the reproduced image. In the embodiment shown in FIG. 1, the processed luminance signal is available itself for this purpose. If the processed luminance signal is not available, a signal representing processed luminance information may be available. For example, the TA7730 luminance processing IC commercially available from Toshiba provides at an output terminal a luminance-representative signal derived by combining r, g, b color signals which have been subjected to contrast and brightness control. Unfortunately, a luminance or luminance representative signal reflecting contrast and brightness control processing is not provided by other ICs, e.g., such as the TDA4580 available from Valvo.

The apparatus disclosed in concurrently filed Lagoni U.S. Patent Application entitled "CONTROL SIGNAL GENERATOR FOR A TELEVISION SYSTEM" is directed to this problem by combining the r, g, b color signals produced at respective output terminals of an IC to produce a signal at least approximately representing processed luminance information. However, the resulting "summed luminance" signal contains pulses corresponding to the high level (e.g., in the range of −100 to −160 IRE) retrace blanking pulses contained in the r, g, b signals which are combined, unlike the summed luminance signal produced by the TA7730 IC, in which r, g, b signals are combined before retrace blanking pulses are added. The pulses contained in a summed luminance signal extend significantly below the black level and will therefore substantially affect the average value (as well as the peak-to-peak value). Accordingly, a control signal derived by detecting the average value of the summed signal would not accurately represent the brightness of the reproduced image. The control signal generator disclosed in the Lagoni application also includes provisions directed to this problem.

Figure 3:
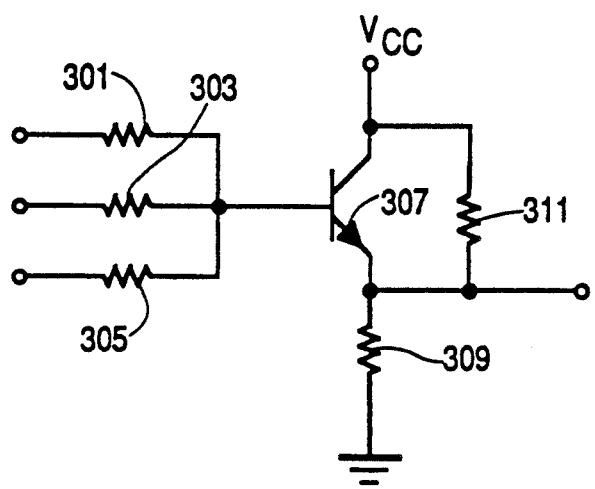
FIG. 3 showing a detailed schematic of a modification to the preferred embodiment shown in FIG. 1.

A schematic of the circuit disclosed in the concurrently filed application is shown in FIG. 3 for the purpose of disclosing apparatus for practicing the invention in a television system in which the processed luminance signal or one representing processed luminance information is not readily available.

Specifically, with respect to FIG. 3, the r, g, b color signals produced at respective output terminals of an IC are summed by means of a resistive combiner comprising resistors 301, 303, 305. The resultant summed signal, produced at the common junction of resistor 301, 303, 305, is coupled to the base of an emitter-follower amplifier 307. An output signal is developed across a load resistor 179 at the low impedance emitter output of emitter-follower 307.

A resistor 181 coupled between a supply voltage source ($V_{CC}$) and the emitter of emitter follower 307 raises the conduction threshold of emitter-follower 307 so that substantially the entirety of the white-going summed signal above the black level is provided at the emitter output, but the pulses, corresponding to the retrace blanking pulses of the r, g, b, color signals, are removed. Thus, due to the increased bias applied to the emitter, the detected average value and the resultant white-stretch control signal, $V_{CA}$, are relatively reliable representations of the average luminance component of the reproduced image.

While resistors 171, 173 and 175 can be proportioned according to the well known luminance matrix equation to accurately produce a luminance signal, a ratio of 1:1:1 has been found to be adequate in practice for providing a processed luminance-representative component suitable for white-stretch processing control.

In addition to the modification discussed above, other modifications are possible. For example, while automatic contrast control in the preferred embodiment is achieved by sensing the processed luminance signal (or a luminance-representative signal as indicated in FIG. 3), it is possible to sense the beam current directly. Furthermore, while white-stretch processing section 5 is located prior to contrast processing section 9 in the preferred embodiment for the reason stated above, it is possible that a different cascade order could be utilized. In the same vein, it is possible to combine the functions of white stretch and contrast processing sections 7 and 9. In this regard, while the invention has been described in terms of an analog implementation, it will be appreciated that a digital implementation may be employed. These and other modifications are contemplated to be within the scope of the invention defined by the following claims.

I claim:

1. In a television system, apparatus comprising:
input means for providing an input video signal;
output means for utilizing an output video signal;
first and second amplitude control means coupled in cascade in the order named between said input means and said output means for controlling the amplitude of said input video signal to produce said output video signal; said first and second amplitude control means having respective first and second gain characteristics controllable in response to respective first and second gain control signals;
said first gain characteristic including a non-linear gain function having a relatively high gain region followed by a relatively low gain region;
said second gain characteristic being a relatively linear gain function compared to said non-linear gain function of said first gain characteristic;
first gain control means for generating said first gain control signal in response to the average value of said output video signal; and
second gain control means for generating said second control signal in response to the peak value of said output video signal.

2. The apparatus defined in claim 1, wherein:
said second amplitude control means comprises a contrast control section.

3. The apparatus defined in claim 2, wherein:
said contrast control stage includes manual control means for controlling said second gain characteristic.

4. The apparatus defined in claim 3, wherein:

said output means includes display means for producing an image in response to said output video signal.

5. The apparatus defined in claim 4, wherein:
brightness control means are coupled in cascade with said contrast control means for controlling the DC component of said output video signal.

6. The apparatus defined in claim 1, wherein:
said video signal represents luminance information.

7. In a television system, apparatus comprising:
input means for providing an input luminance signal;
non-linear processing means having a non-linear gain characteristic and being responsive to said input luminance signal for producing a non-linearly processed luminance signal for which amplitude levels of said input luminance signal below a predetermined amplitude are increased relative to amplitude levels above said predetermined amplitude level; said non-linear amplitude gain characteristic being controllable in response to a first control signal;
contrast control means responsive to said non-linearly processed luminance signal for producing a contrast controlled luminance signal in response to a second control signal;
first control means for generating said first control signal;
second control means for generating said second control signal;
processing means responsive to said contrast controlled luminance signal for producing an output luminance signal suitable for coupling to a display device.

8. The apparatus defined in claim 7 wherein:
said second control means includes a manually adjustable element by which a viewer may adjust the contrast of said image.

9. The apparatus defined in claim 7, wherein:
said second control means includes peak detector means for generating said second control signal in response to white-going peaks of said contrast controlled luminance signal.

10. The apparatus defined in claim 7 wherein:
brightness control means for controlling the DC content of said output luminance signal is coupled in cascade with said contrast control means.

11. The apparatus defined in claim 10, wherein:
said first control means and said second control means are responsive to said output luminance signal.

12. The apparatus defined in claim 7, wherein:
said first control means includes an average detector for generating said first control signal in response to the average value of said output luminance signal.

13. The apparatus defined in claim 11, wherein:
said first control means includes an average detector for generating said first control signal in response to the average value of said output luminance signal; and
said second control means includes peak detector means for generating said second control signal in response to white-going peaks of said contrast controlled luminance signal.

* * * * *